(12) United States Patent
Jagadeesh

(10) Patent No.: US 11,455,187 B2
(45) Date of Patent: Sep. 27, 2022

(54) COMPUTING SYSTEM FOR HIERARCHICAL TASK SCHEDULING

(71) Applicant: Huawei Technologies Co., Ltd., Shenzhen (CN)

(72) Inventor: Pradeep Jagadeesh, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 386 days.

(21) Appl. No.: 16/739,600

(22) Filed: Jan. 10, 2020

(65) Prior Publication Data
US 2020/0159574 A1    May 21, 2020

Related U.S. Application Data

(63) Continuation of application No. PCT/EP2017/067515, filed on Jul. 12, 2017.

(51) Int. Cl.
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | | |
|---|---|---|---|---|
| 8,185,776 B1* | 5/2012 | Gentes | ................ | G06F 11/1438 714/4.11 |
| 8,464,092 B1* | 6/2013 | Gentes | ................ | G06F 11/1438 714/48 |
| 9,367,357 B2* | 6/2016 | Cadambi | ............... | G06F 9/4881 |
| 9,723,070 B2* | 8/2017 | Brelsford | ............ | H04L 67/1008 |
| 9,870,269 B1* | 1/2018 | Viswanathan | ........ | G06F 9/5055 |
| 10,262,390 B1* | 4/2019 | Sun | ........................ | G06F 9/5077 |
| 2004/0215590 A1* | 10/2004 | Kroening | ............... | G06F 9/5072 |

(Continued)

FOREIGN PATENT DOCUMENTS

| | | |
|---|---|---|
| CN | 101819540 A | 9/2010 |
| CN | 103701886 A | 4/2014 |
| WO | 2015034508 A1 | 3/2015 |

OTHER PUBLICATIONS

Santoso et al.; "Hierarchical Job Scheduling for Clusters of Workstations"; ASCI Jun. 2000; (Santoso_2000.pdf; pp. 1-7) (Year: 2000).*

(Continued)

*Primary Examiner* — Hiren P Patel
(74) *Attorney, Agent, or Firm* — Conley Rose, P.C.

(57) ABSTRACT

A computing system comprises a task scheduler in a top-level, at least two cluster controllers in an intermediate-level, and a plurality of nodes in a bottom level. A task scheduler is configured to receive a task request, obtain an adapted task request from the received task request, based on scheduling information stored in the task scheduler, and forward the adapted task request to one of the at least two cluster controllers. Each cluster controller is configured to receive the adapted task request, obtain an adapted cluster task request from the received adapted task request based on cluster scheduling information stored in the cluster controller, and directly or indirectly forward the adapted cluster task request to a node in the plurality of nodes.

20 Claims, 10 Drawing Sheets

(56) References Cited

U.S. PATENT DOCUMENTS

| | | | | |
|---|---|---|---|---|
| 2006/0167966 | A1* | 7/2006 | Kumar | G06F 9/5083 709/201 |
| 2006/0212740 | A1* | 9/2006 | Jackson | G06F 9/5027 714/4.1 |
| 2007/0180451 | A1* | 8/2007 | Ryan | G06F 9/5072 718/104 |
| 2007/0294197 | A1* | 12/2007 | Jackson | G06F 15/161 706/46 |
| 2007/0294697 | A1* | 12/2007 | Theimer | G06F 9/5027 718/102 |
| 2010/0036956 | A1 | 2/2010 | Nishikawa | |
| 2010/0223618 | A1* | 9/2010 | Fu | G06F 9/5077 718/102 |
| 2013/0174174 | A1* | 7/2013 | Jung | G06F 9/5072 718/104 |
| 2014/0208327 | A1* | 7/2014 | Cadambi | G06F 9/5044 718/103 |
| 2014/0237477 | A1* | 8/2014 | Cadambi | G06F 9/5044 718/103 |
| 2015/0006716 | A1 | 1/2015 | Suchter et al. | |
| 2016/0098292 | A1* | 4/2016 | Boutin | G06F 9/505 718/104 |
| 2016/0127146 | A1* | 5/2016 | Gupta | H04L 12/6418 370/338 |
| 2017/0078409 | A1 | 3/2017 | Yazir et al. | |
| 2017/0364392 | A1* | 12/2017 | Spivak | G06F 9/5083 |
| 2018/0024863 | A1* | 1/2018 | Jagadeesh | H04L 41/08 709/226 |
| 2018/0300174 | A1* | 10/2018 | Karanasos | G06F 9/4881 |
| 2018/0373540 | A1* | 12/2018 | Bao | G06F 9/5038 |

OTHER PUBLICATIONS

Wang et al.; "A Three-Phases Scheduling in a Hierarchical Cloud Computing Network"; IEEE 2011; (Wang_2011.pdf; pp. 1-4) (Year: 2011).*

Schwarzkopf, M., et al. "Omega: flexible, scalable schedulers for large compute clusters," EuroSys, Apr. 15-17, 2013, pp. 351-364.

Hindman, B., "Mesos: A Platform for Fine-Grained Resource Sharing in the Data Center," Mar. 22, 2011, 14 pages.

Gui Xiaolin, "Introduction to Grid Technology," 2005, 7 pages (with an English abstract).

Xu gaochao et al, "Distributed Computing System," 2004, 10 pages (with an English abstract).

* cited by examiner

COMPUTING SYSTEM FOR HIERARCHICAL TASK SCHEDULING

CROSS-REFERENCE TO RELATED APPLICATIONS

This application is a continuation of International Patent Application No. PCT/EP2017/067515, filed on Jul. 12, 2017. The disclosures of the aforementioned application are hereby incorporated by reference in its entirety.

TECHNICAL FIELD

The present disclosure relates to distributed decision making and management of large computing systems, such as data centers, and in particular to a computing system and method for hierarchical task scheduling, i.e. allocation or provisioning of hardware resources to computation tasks in a hierarchical way. The present disclosure further relates to a hierarchical manner of collecting scheduling information, which is evaluated in order to schedule tasks.

BACKGROUND

To manage hardware resources in a data center according to other approaches, a conventional central task scheduler 101 is applied in a conventional task scheduling system 100, as it is e.g. shown in FIG. 1. The central task scheduler 101 can receive task requests and schedule computation tasks to hardware resources in the data center according to the task request. A computation task can be executing any kind of algorithm or executable code on a physical or virtual machine in the data center. Hardware resources can include memory, central processing units (CPUs), graphic processing units (GPUs), storage, input/output (I/O) bandwidth or network bandwidth of a virtual machine or a physical machine. For successful task scheduling, the central task scheduler 101 is arranged in a top-level 102 of the data center, i.e. an organizational management layer in which management devices of the data center are arranged. According to conventional solutions, one management device, such as the central task scheduler 101, is connected to a plurality of computation nodes 103 (such as physical machines or virtual machines in the data center). The central task scheduler 101 collects scheduling information from the nodes 103 and schedules computation tasks to the hardware resources in the nodes 103 according to the collected scheduling information and the received task request. The scheduling information e.g. can comprise information about a configuration or a status of a node 103. The nodes 103 are typically arranged in a bottom-level 104 of the data center, i.e. an organizational layer in the data center in which many physical or virtual machines or servers are arranged in order to process computation tasks in the data center.

FIG. 2 shows a more detailed schematically overview of a conventional task scheduling system, in which a central task scheduler receives a task request and schedules computation tasks to nodes in a data center according to the received task request and according to scheduling information which is stored in a central data base. The central task scheduler as shown in FIG. 2 can for example also be used to manage virtual machines, e.g. in a cloud computing environment. The central task scheduler can e.g. be regarded a virtual machine orchestrator or a cloud orchestrator. The scheduling information is collected by means of agents, which are running on the nodes and obtain status and configuration information of a corresponding node and store the so collected scheduling information in the central data base. A node can either be a physical machine, which provides hardware resources, such as a virtual machine hypervisor. A node can also be a virtual machine, which is running, together with e.g. a plurality of other virtual machines on the same physical machine. The agents can either be running on a physical machine, in a virtual machine or simultaneously in both entities.

FIG. 3 shows a method 300 for operating a conventional task scheduling system. In step 301 a task request is provided to the conventional task scheduling system. In step 302 the task request is received by a central task scheduler, which in step 303 creates a schedule and schedules a computation task according to the received task request and according to scheduling information stored in a central data base 304. In step 305 the computation task is scheduled to physical nodes in a data center accordingly. In step 306 the method successfully terminates.

As it is illustrated in FIGS. 1 to 3, in a conventional task scheduling system, a central task scheduler (including e.g. exclusively one central data base) has to process all scheduling information which is provided by all nodes that are connected to the central task scheduler. Further, in order to process a task request, that is, to allocate hardware resources of at least one node out of all nodes that are connected to the central task scheduler to a computation task of a task request, the conventional task scheduler has to evaluate scheduling information which is provided by all nodes connected to the central task scheduler, and which can be very extensive due to the high level of granularity of the scheduling information.

Due to the amount of information that has to be processed by a central task scheduler, the central task scheduler easily can become a bottleneck, not only regarding performance of scheduling tasks, but also regarding overall processing performance of the data center in which the central task scheduler is located, since computation tasks are scheduled less efficiently to the nodes to which the central task scheduler is connected. As a result, service level agreements, i.e. agreements regarding a predefined level of service quality which has to be met by an operator of the data center within a predefined period of time, cannot be complied with.

Therefore, in other approaches there is a need for a task scheduling system, which can handle a large number of computing nodes which are connected to the task scheduling system, and which can also handle a high number of incoming task requests within a predefined time interval. In addition, in other approaches there is no solution how to efficiently collect and evaluate a high amount of scheduling information which is provided by computing nodes that are connected to a central task scheduler in a data center.

SUMMARY

In view of the above-mentioned problems and disadvantages, the present disclosure aims to improve the conventional systems and methods. The present disclosure thereby has the object to provide a computing system, which allows for fast and efficient processing of task requests, to improve the allocation of hardware resources of computing nodes to computation tasks according to the task request. The present disclosure also has the object to improve collecting scheduling information, i.e. to efficiently allow a large number of nodes to provide scheduling information which can be efficiently evaluated in order to process the task request.

The object of the present disclosure is achieved by the solution provided in the enclosed independent claims.

Advantageous implementations of the present disclosure are further defined in the dependent claims.

In particular, the present disclosure proposes a solution that implements a distributed, hierarchical way of scheduling tasks and collecting scheduling information. To this end, processing of task requests is not only performed by a task scheduler in an organizational top-level, but also by task scheduling entities which are located in an organizational intermediate layer, which is adapted to a hierarchical structure of a typical data center. Decisions regarding scheduling of a computation task according to a task request are not only done in a task scheduler in a top-level of a data center, but also on a cluster-level and/or a rack-level, which corresponds to a typical organizational structure of a data center. In a data center, a plurality of physical computation nodes (which can be physical machines, and/or which can include virtual machines) are grouped in a rack, while a plurality of racks are groups in a cluster. The present disclosure makes use of this structure. This introduces a hierarchical and decentralized way of decision making, which improves efficiency, performance and scalability of task scheduling in a data center. Making decisions regarding task scheduling on a cluster-level and/or a rack-level can be regarded as making decisions on an intermediate level, before hardware resources of nodes (which are located in a bottom-level of the data center) are allocated to a computation task according to a task request.

The solution proposed by the present disclosure also allows to efficiently collect and evaluate scheduling information by collecting the scheduling information in a hierarchical way (i.e. by collecting the scheduling information in the intermediate level and only providing optimized scheduling information to the top-level to ensure that on each level scheduling information is collected and stored which is exclusively necessary for making a decision on the respective level.

A first aspect of the present disclosure provides a computing system for hierarchical task scheduling, comprising a task scheduler in a top-level, at least two cluster controllers in an intermediate level, and a plurality of nodes in a bottom-level, wherein the task scheduler is configured to receive a task request, obtain an adapted task request from the received task request, based on scheduling information stored in the task scheduler, and forward the adapted task request to one of the at least two cluster controllers, and wherein each cluster controller is configured to receive the adapted task request, obtain an adapted cluster task request from the received adapted task request based on cluster scheduling information stored in the cluster controller, and directly or indirectly forward the adapted cluster task request to a node in the plurality of nodes.

The computing system according to the first aspect uses a task scheduler in a top-level and at least two cluster controllers in an intermediate level to allocate hardware resources of a node out of a plurality of nodes in a bottom-level to a computation task according to a task request. This ensures that the task scheduler in the top-level only has to decide whether to forward an adapted task request based on the received task request to one of the cluster controllers in the intermediate level, and does not need to decide to which node out of the plurality of nodes an adapted task request has to be forwarded in order to allocate hardware resources of the node to a computation task according to the received resource request. The cluster controller operates on a cluster level of the datacenter.

This has the advantage that the task scheduler needs to perform less processing in order to process a task request, since processing task requests can be outsourced to the at least two cluster controllers in the intermediate layer. Each of the task scheduler or of the at least two cluster controllers only performs decision making regarding a section of the data center which it is responsible for, which reduces the overall processing load per task scheduler, respectively per cluster controller. As a result, overall processing efficiency of the hierarchical task scheduling system is improved, since task requests can be processed faster and no bottleneck appears.

To further improve efficiency of processing, the task scheduler obtains an adapted task request from the received task request based on scheduling information stored in the task scheduler. Forwarding this adapted task request to at least one of the cluster controllers ensures that the cluster controller only needs to process information in the adapted task request which is relevant for the portion of the data center which is covered by the scope of the cluster controller which received the adapted task request.

Each cluster controller is configured to obtain an adapted cluster task request from the received adapted task request. This enables providing an optimized cluster task request by each cluster controller, which includes less information to be processed, when the adapted cluster task request is directly or indirectly forwarded to a node in the plurality of nodes. The adapted cluster task request is obtained based on cluster scheduling information stored in the respective cluster controller. Since the adapted cluster task request is optimized compared to the adapted task request and comprises less information, a node which receives the adapted cluster task request can more efficiently process the adapted cluster task request. The adapted cluster task request in particular exclusively comprises information which is necessary for performing a computation task on a node out of the plurality of nodes. That is, less information has to be processed by the respective node, and performance of the overall computing system for hierarchical task scheduling is increased.

Further, it has to be noticed that the adapted task request is generated based on scheduling information stored in the task scheduler, whereas the adapted cluster task request is generated based on cluster scheduling information stored in the cluster controller. That is, the task scheduler only has to store and process information which is required for a decision made by the task scheduler in the top-level, whereas each cluster controller only has to store and process information which is required to make a decision by each cluster controller in the intermediate level. As a result, processing load of the task scheduler as well as of each cluster controller is reduced, which increases overall processing performance of the computing system for hierarchical task scheduling.

It is to be noted that the adapted cluster task requests are either forwarded to the nodes directly or indirectly. That is, the adapted cluster task request can either be forwarded directly (i.e. with no further processing entity in between) to a node, or can be forwarded indirectly (i.e. by means of at least one further entity which can process the adapted cluster task request before it is transmitted to the node). This ensures that, before processing the adapted cluster task request in the node, further optimization can be applied to the adapted cluster task request, i.e. by applying further hierarchical forwarding according to the above described principle.

As a result, the computing system according to the first aspect advantageously improves efficiency of processing task requests by applying hierarchical task scheduling and also allows for efficient collecting of scheduling information in a hierarchical way, by providing exclusively the information to each level of the hierarchy which is required for a decision in the respective level.

In a first implementation form of the system according to the first aspect, each node in the plurality of nodes can be associated with exactly one cluster controller, wherein each cluster controller can further be configured to forward the adapted cluster task request to a node which is associated with the respective cluster controller.

This ensures that a precise relationship between a cluster controller and a node in the computing system is defined, and the scope of nodes for which a cluster controller is responsible can efficiently be determined when processing an adapted task request in a cluster controller.

In a second implementation form of the computing system according to the first aspect, the computing system further can comprise at least two sub-cluster controllers in the intermediate level, wherein each cluster controller further can be configured to directly forward the adapted cluster task request to one sub-cluster controller based on the cluster scheduling information stored in the cluster controller, and wherein each sub-cluster controller can be configured to receive the adapted cluster task request, obtain an adapted sub-cluster task request from the adapted cluster task request based on sub-cluster scheduling information stored in the sub-cluster controller, and directly or indirectly forward the adapted sub-cluster task request to a node in the plurality of nodes.

This ensures that a further hierarchical layer of sub-cluster controllers is introduced in the intermediate-level, and that processing load of the overall system can be distributed to the tasks scheduler, the at least two cluster controllers and the at least two sub-cluster controllers. The sub-cluster controllers in particular can operate on a rack-level of a datacenter. Processing of information necessary for scheduling task is also optimized, since sub-cluster task requests can be obtained based on sub-cluster scheduling information stored in the sub-cluster controllers. Introducing a further hierarchical layer of sub-cluster controllers in the system according to the first aspect is in particular advantageous, since thereby a structure of the computing system according to the first aspect can be closely adapted to a typical structure of a data center. More specifically, the tasks scheduler in the top-level can be arranged in a management level of the data center, the cluster controllers in the intermediate level can be arranged in clusters of the data center and the sub-cluster controllers in the intermediate level can be arranged in racks in the data center. A rack typically includes a few nodes (i.e. physical machines) together with one sub-cluster controller per rack.

In a third implementation form of the computing system according to the first aspect, each sub-cluster controller can be associated with exactly one cluster controller, wherein each cluster controller can be configured to forward the adapted cluster task requests to a sub-cluster controller which is associated with the respective cluster controller. This ensures that a precise relationship between sub-cluster controllers and cluster controllers is defined, and that a scope of sub-cluster controllers for which a respective cluster controller is responsible can easily be determined, thereby ensuring overall processing efficiency of task scheduling in the cluster controllers and sub-cluster controllers.

In a fourth implementation form of the computing system according to the first aspect, each node in the plurality of nodes can be associated with exactly one sub-cluster controller, wherein each sub-cluster controller can further be configured to forward the adapted sub-cluster task request to a node which is associated with the respective sub-cluster controller.

This ensures that a precise relationship between nodes and sub-cluster controllers is given, and that a scope of nodes for which a respective sub-cluster controller is responsible can easily be determined, thereby improving overall operating efficiency of the computing system.

In a fifth implementation form of the computing system according to the first aspect, the task scheduler can further be configured to obtain the scheduling information based on optimized cluster scheduling information provided by the at least two cluster controllers.

This ensures that exclusively information necessary for generating the adapted task request and for forwarding the adapted task request to a respective cluster controller is stored in the task scheduler. As a result, information overhead can be reduced and efficiency of processing in the task scheduler can be increased.

In a sixth implementation form of the computing system according to the first aspect, each cluster controller can further be configured to obtain the cluster scheduling information based on optimized status and/or configuration information directly or indirectly provided by agents in the nodes.

This ensures that exclusively information necessary for generating the adapted cluster task request and for forwarding the adapted cluster task request to a node (directly or indirectly) is stored in the cluster controller. Thereby, information overhead in the cluster controller can be reduced and overall operating efficiency of the cluster controller can be increased.

In a seventh implementation form of the computing system according to the first aspect, each cluster controller can further be configured to obtain the cluster scheduling information based on optimized sub-cluster information provided by the at least two sub-cluster controllers.

This ensures that exclusively information necessary for generating the adapted cluster task request and for forwarding the adapted cluster task request to a node (directly or indirectly) is stored in the cluster controller. Thereby, information overhead in the cluster controller can be reduced and overall operating efficiency of the cluster controller can be increased.

In an eighth implementation form of the computing system according to the first aspect, each sub-cluster controller can further be configured to obtain the sub-cluster scheduling information based on optimized status and/or configuration information directly or indirectly provided by agents in the nodes.

This ensures that exclusively information necessary for generating the adapted cluster task request and for forwarding the adapted cluster task request to a node (directly or indirectly) is stored in the cluster controller. Thereby, information overhead in the cluster controller can be reduced and overall operating efficiency of the cluster controller can be increased.

In a ninth implementation form of the computing system according to the first aspect, each agent can further be configured to analyze a status and/or a configuration of the corresponding node in order to obtain the optimized status and/or configuration information.

This ensures that each agent can be configured to exclusively collect information which is necessary (i.e. the optimized status and/or configuration information) for efficient operation of a respective cluster controller of sub-cluster controller.

In a tenth implementation form of the computing system according to the first aspect, each node can further be configured to schedule a task to a resource in the node, based on the adapted cluster task request or the adapted sub-cluster task request, respectively.

This ensures that exclusively the information provided by the adapted cluster task request or the adapted sub-cluster task request is required by a node to schedule a task to a resource in the node, thereby avoiding information overhead to be processed in the node and increasing operation efficiency of each node and of the overall computing system according to the first aspect.

In an eleventh implementation form of the computing system according to the first aspect, the task scheduler can further be configured to obtain the adapted task request and/or to forward the adapted task request to one of the at least two cluster controllers based on an explicit constraint defined in the task request and/or an implicit constraint imposed by the task request.

Thereby a versatile way of obtaining and forwarding the adapted task request by the task scheduler is provided, since a decision can be based on an explicit constraint (i.e. a request or requirement which is explicitly defined in the task request) and/or an implicit constraint imposed by the task request (e.g. additional information which can be derived from the task request, such as information about a user that sent the request, or a source from which the request was received.

In a twelfth implementation form of the computing system according to the first aspect, each cluster controller can further be configured to obtain the adapted cluster task request and/or to forward the adapted cluster task request to one of the at least two sub-cluster controllers based on an explicit constraint defined in the adapted task request and/or an implicit constraint imposed by the adapted task request.

Thereby a versatile way of obtaining and forwarding the adapted cluster task request by the cluster controller is provided, since a decision can be based on an explicit constraint (i.e. a request or requirement which is explicitly defined in the adapted task request) and/or an implicit constraint imposed by the adapted task request (e.g. additional information which can be derived from the adapted task request, such as information about a user that sent the request, or a source from which the request was received).

In a thirteenth implementation form of the computing system according to the first aspect, each sub-cluster controller can further be configured to obtain the adapted sub-cluster task request and/or to forward the adapted sub-cluster task request to one of the nodes based on an explicit constraint defined in the adapted cluster task request and/or an implicit constraint imposed by the adapted cluster task request.

Thereby a versatile way of obtaining and forwarding the adapted sub-cluster task request by the cluster controller is provided, since a decision can be based on an explicit constraint (i.e. a request or requirement which is explicitly defined in the adapted cluster task request) and/or an implicit constraint imposed by the adapted cluster task request (e.g. additional information which can be derived from the adapted cluster task request, such as information about a user that sent the request, or a source from which the request was received).

A second aspect of the present disclosure provides a method for operating a computing system for hierarchical task scheduling, the method comprising the steps of receiving, by a task scheduler in a top-level, a task request, obtaining, by the task scheduler, an adapted task request from the received task request, based on scheduling information stored in the task scheduler, forwarding, by the task scheduler, the adapted task request to one of at least two cluster controllers in an intermediate-level, receiving, by the cluster controller, the adapted task request, obtaining, by the cluster controller, an adapted cluster task request from the received adapted task request, based on cluster scheduling information stored in the cluster controller and directly or indirectly forwarding, by the cluster controller, the adapted cluster task request to a node in a plurality of nodes in a bottom-level.

In a first implementation form of the method according to the second aspect, each node in the plurality of nodes can be associated with exactly one cluster controller, wherein the method further comprises forwarding, by a cluster controller, the adapted cluster task request to a node which is associated with the respective cluster controller.

In a second implementation form of the method according to the second aspect, the computing system further can comprise at least two sub-cluster controllers in the intermediate level, wherein the method further comprises directly forwarding, by a cluster controller, the adapted cluster task request to one sub-cluster controller based on the cluster scheduling information stored in the cluster controller, and receiving, by a sub-cluster controller, the adapted cluster task request, obtaining by the sub-cluster controller, an adapted sub-cluster task request from the adapted cluster task request based on sub-cluster scheduling information stored in the sub-cluster controller, and directly or indirectly forwarding, by the sub-cluster controller, the adapted sub-cluster task request to a node in the plurality of nodes.

In a third implementation form of the method according to the second aspect, each sub-cluster controller can be associated with exactly one cluster controller, wherein the method further can comprise forwarding, by a cluster controller, the adapted cluster task request to a sub-cluster controller which is associated with the respective cluster controller.

In a fourth implementation form of the system according to the second aspect, each node in the plurality of nodes can be associated with exactly one sub-cluster controller, wherein the method further can comprise forwarding, by a sub-cluster controller, the adapted sub-cluster task request to a node which is associated with the respective sub-cluster controller.

In a fifth implementation form of the method according to the second aspect, the method further can comprise obtaining, by the task scheduler, the scheduling information based on optimized cluster scheduling information provided by the at least two cluster controllers.

In a sixth implementation form of the method according to the second aspect, the method further can comprise obtaining, by a cluster controller, the cluster scheduling information based on optimized status and/or configuration information directly or indirectly provided by agents in the nodes.

In a seventh implementation form of the method according to the second aspect, the method further can include obtaining, by a cluster controller, the cluster scheduling information based on optimized sub-cluster information provided by the at least two sub-cluster controllers.

In an eighth implementation form of the method according to the second aspect, the method further can comprise obtaining, by a sub-cluster controller, the sub-cluster scheduling information based on optimized status and/or configuration information directly or indirectly provided by agents in the nodes.

In a ninth implementation form of the method according to the second aspect, the method further can include analyzing by an agent, a status and/or a configuration of the corresponding node in order to obtain the optimized status and/or configuration information.

In a tenth implementation form of the method according to the second aspect, the method further can include scheduling, by a node, a task to a resource in the node, based on the adapted cluster task request or the adapted sub-cluster task request, respectively.

In an eleventh implementation form of the method according to the second aspect, the method further can include obtaining, by the task scheduler, the adapted task request and/or forwarding, by the task scheduler, the adapted task request to one of the at least two cluster controllers, based on an explicit constraint defined in the task request and/or an implicit constraint imposed by the task request.

In a twelfth implementation form of the method according to the second aspect, the method further can include obtaining, by a cluster controller, the adapted cluster task request and/or forwarding, by the cluster controller, the adapted cluster task request to one of the at least two sub-cluster controllers based on an explicit constraint defined in the adapted task request and/or an implicit constraint imposed by the adapted task request.

In a thirteenth implementation form of the method according to the second aspect, the method further can include obtaining, by a sub-cluster controller, the adapted sub-cluster task request and/or forwarding, by the sub-cluster controller, the adapted sub-cluster task request to one of the nodes based on an explicit constraint defined in the adapted cluster task request and/or an implicit constraint imposed by the adapted cluster task request.

The method of the second aspect and its implementation forms achieved the same advantageous as the computing system of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to meant that the respective entity is adapted to or configured to perform the respective steps and functionalities. Even if, in the following description of specific embodiments, a specific functionality or step to be performed by external entities is not reflected in the description of a specific detailed element of that entity which performs that specific step of functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of specific embodiments in relation to the enclosed drawings in which.

DETAILED DESCRIPTION OF EMBODIMENTS

Figure 1:
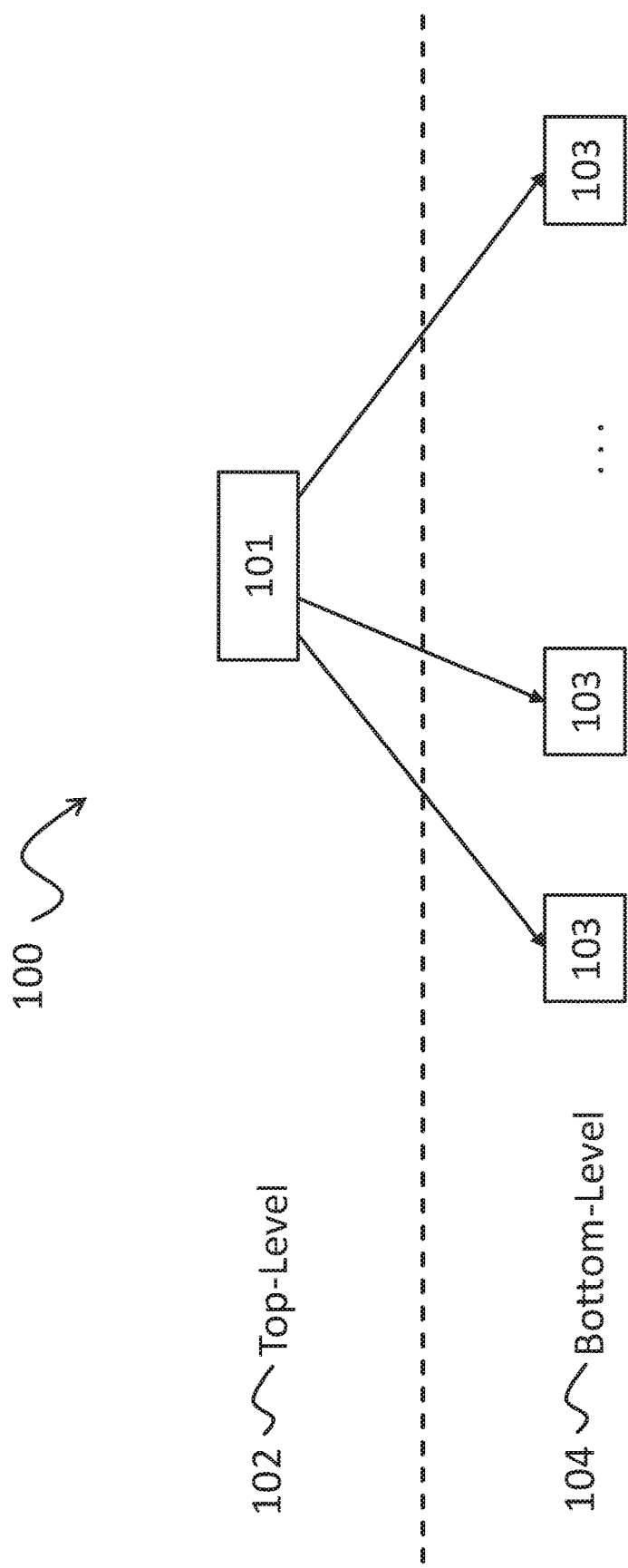
FIG. 1 shows a schematic overview of a conventional task scheduling system according to other approaches.
Figure 2:
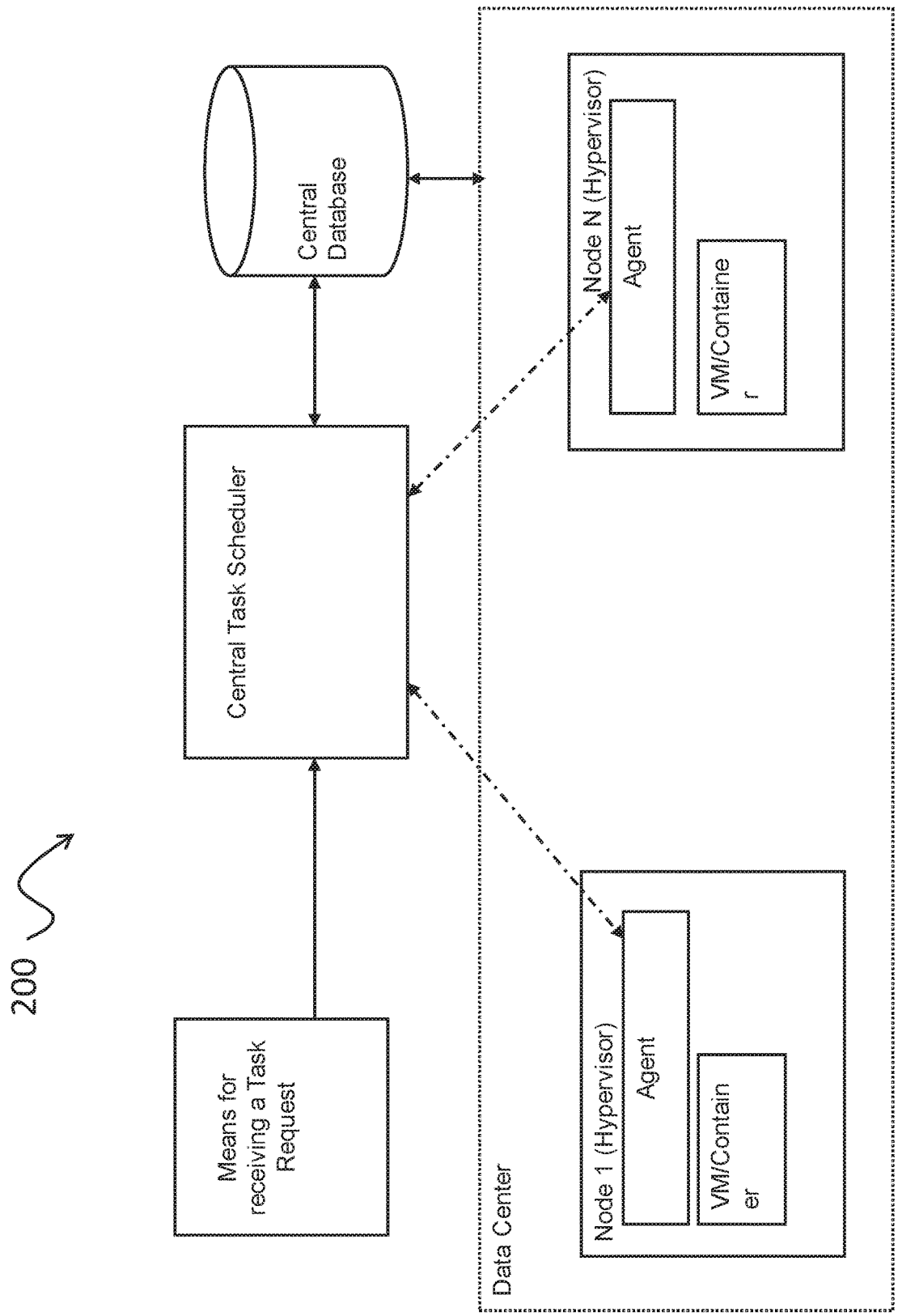
FIG. 2 shows a more detailed schematic overview of a task scheduling system according to other approaches.
Figure 3:
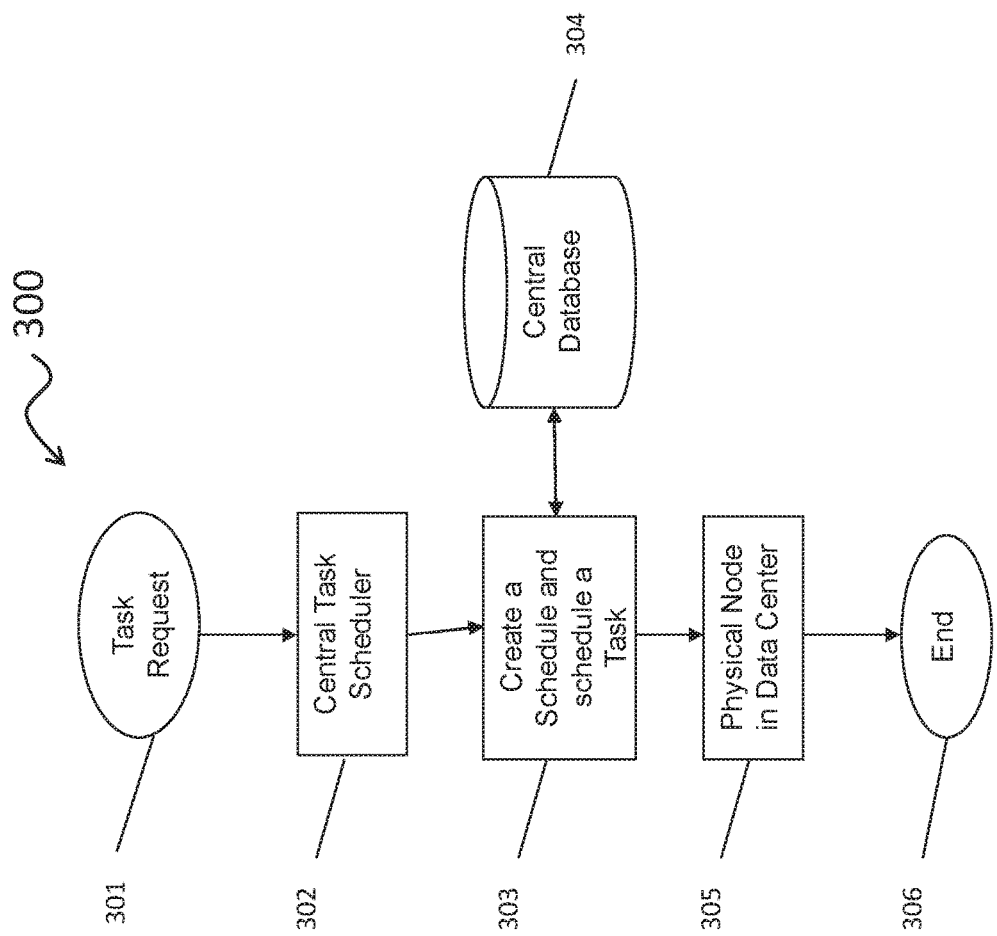
FIG. 3 shows a method for operating a task scheduling system according to other approaches.
Figure 4:
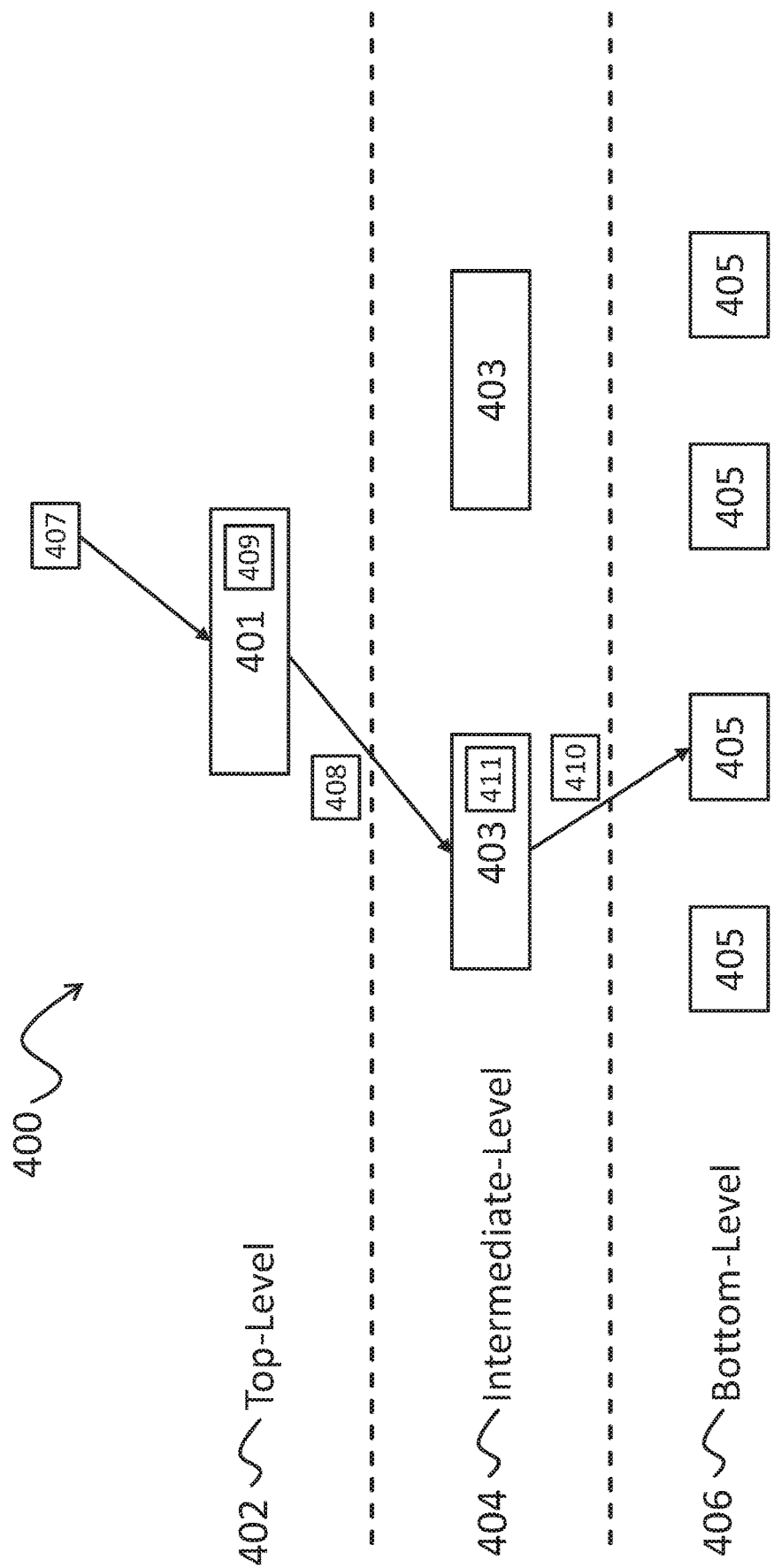
FIG. 4 shows a schematic overview of a task scheduling system 400 according to an embodiment of the present disclosure.

FIG. 4 shows a schematic overview of a computing system 400 according to an embodiment of the present disclosure. The computing system 400 is particularly suited for hierarchical task scheduling. The computing system 400 comprises a task scheduler 401 in a top-level 402, at least two cluster controllers 403 in an intermediate-level 404, and a plurality of nodes 405 in a bottom-level 406.

The task scheduler 401 is an entity in a data center which can receive a task request 407 (which can include one or more computation tasks) and allocate hardware resources of the nodes 405 (i.e. physical machines or virtual machines) in the data center to the computation task of the received task request 407 in order to schedule the received task request 407. The top-level 402 is regarded as an organizational layer of a data center in which processes regarding management and operation control of a data center are performed, and in which management or control requests (such as the task request 407) are received first, before other entities in the data center are involved. After receiving the task request 407 by the task scheduler 401, the task scheduler 401 obtains an adapted task request 408 from the received task request 407. Obtaining the adapted task request 408 in particular includes preparing the received task request 407 for further processing in the intermediate level 404, in particular by removing information overhead from the received task request 407, which is only necessary for processing the received task request 407 in the task scheduler 401. The adapted task request 408 is also obtained by the task scheduler 401 based on scheduling information 409 which is stored in the task scheduler 401. The scheduling information 409 in particular determines which information overhead is to be reduced from the received task request 407 in order to generate the adapted task request 408. In turn, the task scheduler 401 determines to which cluster controller 403 out of the at least two cluster controllers 403 the adapted task request 408 is to be forwarded. The scheduling information 409 specifically allows to determine which cluster controller 403 can provide a way to the hardware resources that are required for performing the computation task which is included in the received task request 407. The task scheduler 401 forwards the adapted task request 408 to a cluster controller 403 which in turn can directly or indirectly forward the adapted task request 408 (which can be further processed and adapted during forwarding) to a node 405 that provides the required hardware resources.

The at least two cluster controllers 403 are located in an intermediate level 404. The intermediate level 404 is to be regarded as an organizational layer of the data center in which management and control operations are further forwarded and processed, before decisions that are based on the management and control operations finally take effect on the nodes 405 that are located in the data center. Each cluster controller 403 in the intermediate-level 404 can receive an adapted task request 408 which is provided by the task scheduler 401. A cluster controller 403 that received an adapted task request 408 further processes the adapter task request 408 and obtains an adapted cluster task request 410 from the received adapted task request 408. This includes removing information overhead from the received adapted task request 408 which is not necessary for processing the adapted cluster task request 410 in the next below level. The information overhead that is to be removed from the received adapted task request 408 is in particular determined based on clusters scheduling information 411 that is stored in the cluster controller 403. A decision, to which node 405 in the plurality of nodes 405 the adapted cluster task request 410 is to be forwarded is also based on the cluster scheduling information 411 stored in the cluster controller 403. The cluster scheduling information 411 in particular allows to determine, whether a node 405 to which the adapted cluster task request 410 should be forwarded can provide the hardware resources which are required by the received task request 407. If a node 405 provides the required hardware resources, the adapted cluster task request 410 can either be forwarded directly to the respective node 405, i.e. without any other entity that is involved in forwarding or further processing the adapted cluster task request 410, or indirectly, that is the adapted cluster task request 410 can be further processed or forwarded by further entities, before it reaches the respective node 405 in the plurality of nodes 405. The nodes 405 are all arranged in the bottom-level 406. The bottom-level 406 is regarded an organizational layer of the data center in which physical or virtual machines are located that perform the computation task, and which do not further adapt or forward an adapted cluster task request 410, but process the adapted cluster task request 410 themselves.

Optionally, each node 405 in the plurality of nodes 405 can be associated with exactly one cluster controller 403. That is, the cluster controller 403 has a well-defined scope of nodes 405, to which adapted cluster task requests 410 can be forwarded, and based on which cluster scheduling information 411 can be obtained. The cluster controller 403 can only forward the adapted cluster task request 410 to a node 405 which is associated with the respective cluster controller 403.

Figure 5:
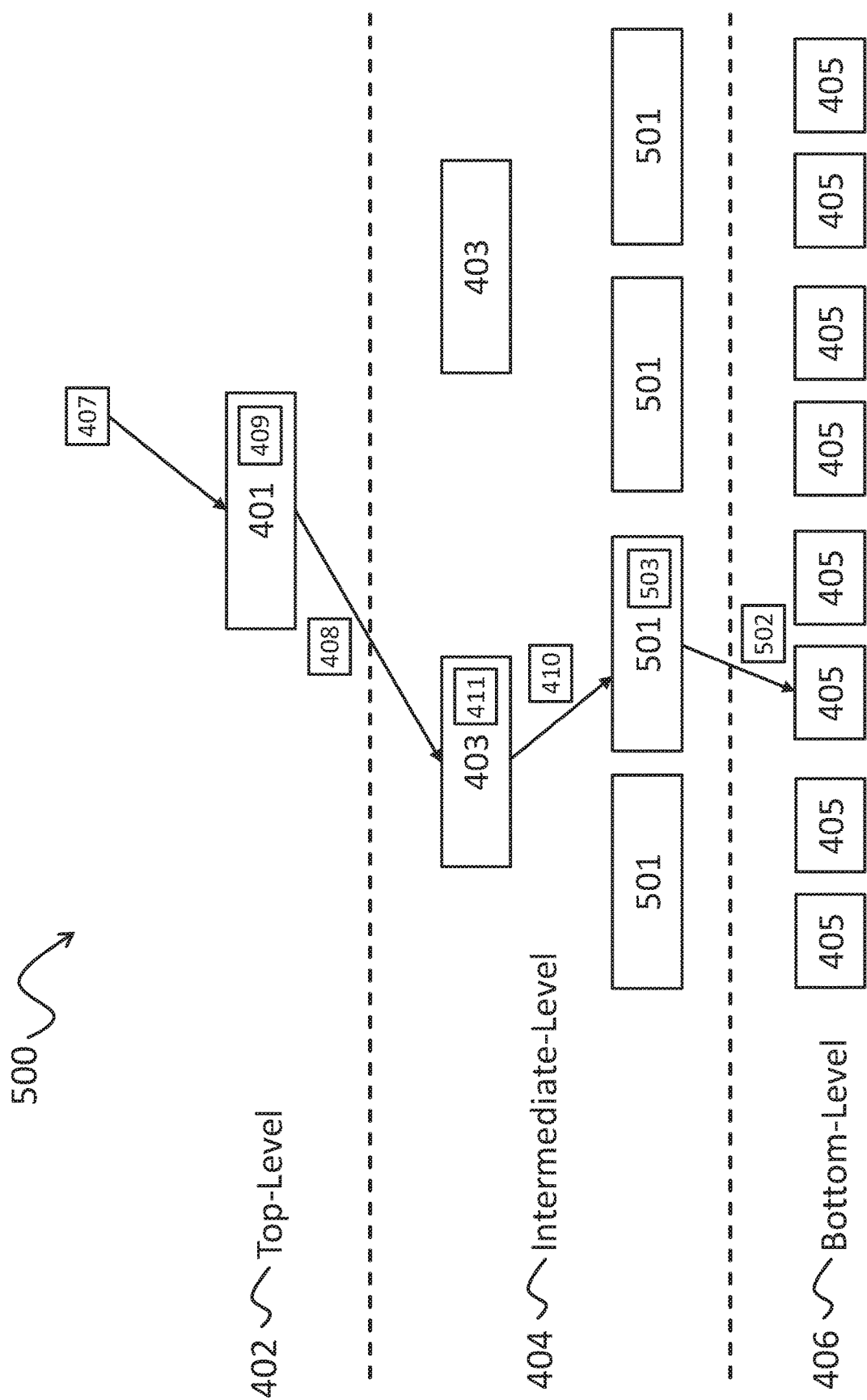
FIG. 5 shows a more detailed schematic overview of a task scheduling system 500 according to an embodiment of the present disclosure.

FIG. 5 shows a schematic overview of a computing system 500 according to the present disclosure in more detail. The computing system 500 includes all features and functionality as described in view of FIG. 4 above. To this end, identical features are labelled with identical reference signs.

As it is shown in FIG. 5, the computing system 500 further can comprise at least two sub-cluster controllers 501, which are optional. The at least two sub-cluster controllers 501 are located in the intermediate-level 404. When at least two sub-cluster controllers 501 are present in the computing system 500, the cluster controllers 403 can be configured to not only directly forward the adapted cluster task request 410 to a node 405 in the plurality of nodes 405. The cluster controllers 403 can additionally or alternatively be configured to directly forward the adapted cluster task request 410 to one sub-cluster controller 501, wherein the forwarding decision is based on the cluster scheduling information 411 stored in the cluster controller 403. In an embodiment, the cluster controller 403 forwards the adapted cluster task request 410 to a sub-cluster controller 501, which is then capable of forwarding the adapted cluster task request 410 (or a further adapted version of the adapted cluster task request 410) to a node 405 in the plurality of nodes 405, which can provide the hardware resources as required by the computation task in the received task request 407. This can in particular be determined based on the cluster scheduling information 411 in the cluster controller 403.

Each sub-cluster controller 501 is further configured to receive an adapted cluster task request 410 that is provided by a cluster controller 403. Based on the received adapted cluster task request 410 and on sub-cluster scheduling information 503 that is stored in the sub-cluster controller 501, the sub-cluster controller 501 obtains an adapted sub-cluster task request 502. In the adapted sub-cluster task request 502, information overhead that was present in the adapted cluster task request 410 is removed such that the adapted sub-cluster task request 502 exclusively contains information which is required by a node 405 in the plurality of nodes 405 to allocate hardware resources to a computation task according to the received task request 407. The to be removed information overhead is in particular determined according to the sub-cluster scheduling information 503 stored in the sub-cluster controller 501.

After the sub-cluster task request 502 is obtained by the sub-cluster controller 501, the sub-cluster controller 501 decides to which node 405 in the plurality of nodes 405 the adapted sub-cluster task request 502 is to be forwarded. The adapted sub-cluster task request 502 can be forwarded directly or indirectly according to the above described direct or indirect forwarding manners. Further forwarding and/or scheduling entities can be involved, before the adapted sub-cluster task request 502 reaches a node 405. In an embodiment, it can be determined according to the sub-cluster scheduling information 503, to which node 405 the adapted sub-cluster task request 502 is to be forwarded. More specifically, the adapted sub-cluster task request 502 is forwarded by the sub-cluster controller 501 to a node 405, which is able to provide the hardware resources which are required by the computation task according to the received task request 407.

Further optionally, each sub-cluster controller 501 can be associated with exactly one cluster controller 403. Each cluster controller 403 can be configured to forward the adapted cluster task request 410 to a sub-cluster controller 501 which is associated with the respective cluster controller 403. That is, each cluster controller 403 has a well-defined scope of sub-cluster controllers 501 to which the adapted cluster task request 410 can be forwarded, and based on which the sub-cluster scheduling information 503 that is to be stored in the sub-cluster controller 501 can be obtained. The cluster controller 403 can only forward the adapted cluster task request 410 to a sub-cluster controller 501 which is associated with the cluster controller 403.

Further optionally, each node 405 in the plurality of nodes 405 can be associated with exactly one sub-cluster controller 501, wherein each sub-cluster controller 501 further can be configured to forward the adapted sub-cluster task request 502 exclusively to a node 405 which is associated with the respective sub-cluster controller 501. That is, each sub-cluster controller 501 has a well-defined scope of nodes 405 to which the adapted sub-cluster task request 502 can be forwarded, and based on which the sub-cluster scheduling information 503 that is to be stored in the sub-cluster controller 501 can be obtained.

Figure 6:
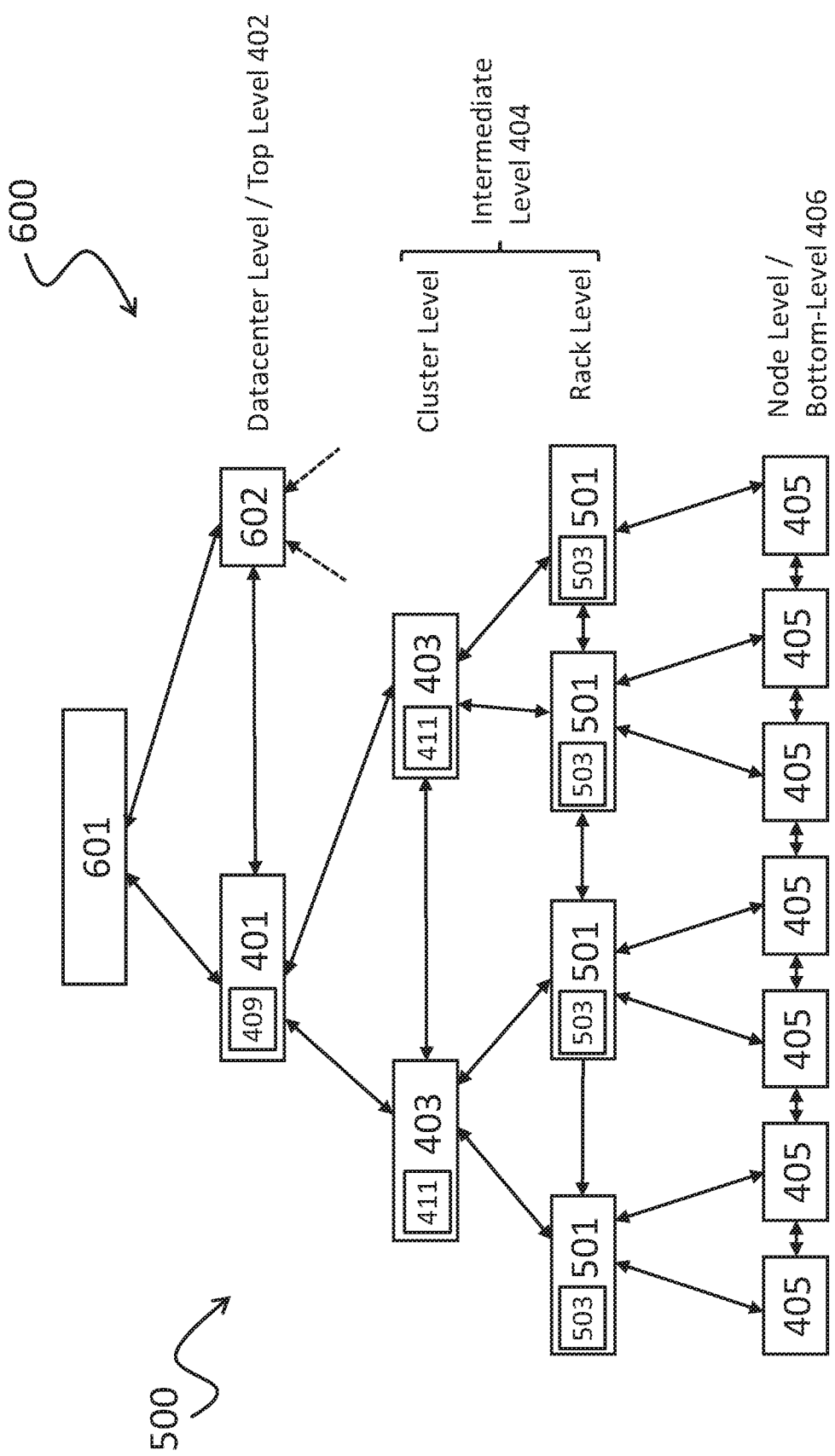
FIG. 6 shows an operating example of a task scheduling system 600 according to an embodiment of the present disclosure.

FIG. 6 shows an operating example of a task scheduling system 600 according to the present disclosure.

The task scheduling system 600 as shown in FIG. 6 includes the task scheduling system 500 as described above. Further, the task scheduling system 600 includes a data center task scheduler 601, which is capable of receiving a task request and forwarding the received task request to a task scheduler of a data center according to data center scheduling information which is provided by task schedulers of data centers to the data center task scheduler 601. In other words, the data center task scheduler 601 has an overview of separate data centers and their corresponding task schedulers 401, 602 as well as data center scheduling information provided by the corresponding task schedulers. That is, the data center task scheduler 601 can manage task scheduling for several data centers which are connected to the data center task scheduler 601. In FIG. 6, this is illustrated by the task scheduler 401, which is connected to the data center task scheduler 601, and by a further task scheduler 602 of a separate data center, which is also connected to the data center task scheduler 601. The task scheduler 602 comprises identical features and functionality as the task scheduler 401 and can also control a task scheduling system like the task scheduling systems 400 or 500 as described in the above. In FIG. 6, this is illustrated by means of the dashed arrows which are pointing towards the task scheduler 602. The task schedulers 401 and 602 as shown in FIG. 6 both reside in a top-level 402 of a data center. This level can also be regarded as a data center level.

In the following, further optional features and functionality of a task scheduling system, in particular of the task scheduling system 500 according to an embodiment of the present disclosure are described. Although all of the following features and functionality are described in view of FIG. 6, which also includes the data center task scheduler 601 and the task scheduler 602, each feature or function can be included separately in the task scheduling system 400 or 500, i.e. without the presence of further features that are described in view of FIG. 6.

As it is illustrated by the arrows connecting the task scheduler 401 with the cluster controllers 403, the task scheduler 401 can optionally be configured to obtain the scheduling information based on optimized cluster scheduling information provided by the at least two cluster controllers 403. The optimized cluster scheduling information is obtained by simplifying the cluster scheduling information 411 which is stored in the cluster controllers 403, i.e. by removing information overhead from the cluster scheduling information 411 that is not necessary for processing in the task scheduler 401. The scheduling information 409 in particular can include information regarding a number of clusters which are attached to the task scheduler 401, information whether a cluster is free or busy, and information regarding a number of CPUs, or memory, or hardware accelerators, or load present on each cluster.

As it is illustrated in FIG. 6, each cluster controller can optionally be configured to obtain the cluster scheduling information 411 based on optimized status and/or configuration information which is directly or indirectly provided by agents in the nodes 405. The optimized status and/or configuration information is obtained by removing non-necessary information overhead from status and/or configuration information provided by a node 405 such that the optimized status and/or configuration information exclusively includes information which is necessary for processing in the cluster controllers 403. The optimized status and/or configuration information can either be provided directly by agents in the nodes 405 to the cluster controllers, or can be provided indirectly, i.e. by means of an intermediate entity. The cluster scheduling information 411 specifically can include information regarding a number of racks which is connected to a cluster controller 403, information regarding whether a rack is free or busy, or information regarding a number of CPUs, memory or hardware accelerators present in a rack.

As it is further illustrated in FIG. 6, each cluster controller 403 can be optionally configured to obtain the cluster scheduling information 411 based on optimized sub-cluster information provided by the at least two sub-cluster controllers 501. The optimized sub-cluster information is obtained by removing unnecessary information overhead from the sub-cluster information 503 in the sub-cluster controllers 501, which is not necessary for processing in the cluster controllers 403. The cluster scheduling information 411 which is obtained based on optimized sub-cluster information 503 in particular includes the same information details as the cluster scheduling information 411 described in the above paragraph.

As a result, the cluster scheduling information 411 can either be obtained based on optimized status and/or configuration information provided by the nodes 405, or can be obtained based on optimized sub-cluster information provided by the sub-cluster controllers 501. This ensures that the cluster scheduling information 411 can be obtained even in a case in which the computing system 500 does not include sub-cluster controllers 501.

In case that the computing system 500 includes sub-cluster controllers 501, the sub-cluster controllers 501 can optionally be configured to obtain the sub-cluster scheduling information 503 based on optimized status and/or configuration information directly or indirectly provided by agents in the nodes 405. The sub-cluster scheduling information 503 in particular includes information regarding a number of nodes 405 which is present in a rack, information regarding whether a node 405 is free or busy, information regarding a type of a node 405, a number of CPUs or an amount of memory of a node 405, as well as information regarding a type of accelerators present in a node 405.

The cluster controllers 403 in particular operate in a cluster-level of the datacenter, the sub-cluster controllers 501 operate in a rack-level of the datacenter, and the nodes 405 operate in a bottom level of the datacenter.

In order to obtain status and/or configuration information respectively optimized status and/or configuration information, each agent in the nodes 405 can be optionally configured to analyze a status and/or a configuration of the corresponding node 405. The status and/or configuration information obtained by analyzing a status and/or a configuration of a node 405 in particular includes general information regarding the node 405, information regarding the presence of Non-Uniform Memory Access (NUMA) nodes, peripheral component interconnect (PCI) devices, cache architecture, accelerators, reconfigurable hardware, CPU cores, GPUs, network devices, storage, tasks, or processors in the nodes 405. Optimized status and/or configuration information is obtained from the status and/or configuration information by removing communication overhead which is not required for processing in the respective upper level in the task scheduling hierarchy.

As it is illustrated in view of FIGS. 4, 5 and 6, a task request 407 that is received by a task scheduling system according to the disclosure is processed in a top-down manner by the task scheduler 401, the cluster controller 403, and the sub-cluster controller 501, if such a controller is present. According to this top-down manner, the task request 407 is processed, until an adapted cluster task request 410, or an adapted sub-cluster task request 502 is received by a node 405. According to the received adapted cluster task request 410 or the received adapted sub-cluster task request 502, the node 405 schedules a task to a resource in the node 405, i.e. the node 405 allocates hardware resources of the node 405 to a computation task according to the received task request 407.

The collecting of scheduling information however is processed in a bottom-up manner. The agents in the nodes 405 are configured to collect a set of status and/or configuration information $(i_1, \ldots, i_n)$, while only a reduced subset of the collected information is passed to a respective higher level in the hierarchical task scheduling hierarchy. That is, while information $i_1, \ldots, i_6$ is passed from the nodes 405 to the sub-cluster controllers 501, only information $i_1, \ldots, i_5$ is passed from the sub-cluster controllers 501 to the cluster controllers 403, and only information $i_1, \ldots, i_4$ is passed from the cluster controllers 403 to the task scheduler 401.

To determine which information is passed from the nodes 405 to the sub-cluster controllers 501, from the sub-cluster controllers 501 to the cluster controllers 403, and from the cluster controllers 403 to the task scheduler 401, in a bottom-up manner, configuration information can be rolled out to the task scheduler 401, the cluster controllers 403, the sub-cluster controllers 501, and the nodes 403 in a top-down manner. This configuration information can adapt the way of forwarding scheduling information in the described bottom-up manner. The rolled out configuration information can also be used to adapt the behavior of forwarding requests in the task scheduler 401, the cluster controller 403, or the sub-cluster 501, when processing a received task request 407 in the task scheduling system 500. The rolled out configuration information in particular includes configuration information corresponding to each level and each device on each level in the task scheduling hierarchy of the task scheduling system.

As it is illustrated in FIG. 6, the different kinds of scheduling information can be forwarded in a bottom-up manner. The different kinds of scheduling information, however, can also be exchanged among identical devices on a same level in the task scheduling hierarchy. That is, all nodes 405 in the bottom-level 406 can exchange status and/or configuration information, or sub-cluster controllers 501 in the intermediate level 404 can exchange sub-cluster scheduling information 503 among each other, or all cluster controllers 403 can exchange cluster scheduling information 411 among each other, or the task scheduler 401 can also exchange scheduling information 409 with other task schedulers 602. The task scheduler 401 can also provide scheduling information 409 (all optimized scheduling information which is optimized according to the optimizing principles as described in the above) to the data center task scheduler 601.

The following example gives an overview of information which is present at each level of the task scheduling hierarchy, wherein last level (LL) corresponds to information present in a node, LL-1 corresponds to information which is accumulated from nodes which all are associated with a same sub-cluster controller, LL-2 corresponds to information accumulated from all nodes 405, LL-3 corresponds to information accumulated from all sub-cluster controllers 501, LL-4 corresponds to information accumulated from all cluster controllers 403, and LL-5 corresponds to information accumulated from all task schedulers 401.

LL: (node_info, mem, cpu, gpu, pci-devices, accelarators, GPUs, tasks running, num tasks, NUMA info, network resource info, storage, num IO intensive tasks, CPU intensive, Memory intensive)

LL-1: (Node_info, mem, cpu, storage, gpu, accelarators)

LL-2: (Rack_ID, mem, cpu, storage, acc, RK_level_networkinfo)

LL-3: (Cluster_ID, mem, CPU, Storage, type_Acc, CL_level_networkinfo)

LL-4: (DC_ID, mem, CPU, Storage, type_acc, DC_level_networkinfo)

LL-5: (NDC, DC(Mem, CPU, Storage, type_acc, Network_load))

In a specific implementation example, the task request 407 can include a request to provision a virtual machine in the data center, or to adapt a configuration of a virtual machine in the data center or to provision or adapt a cloud environment provided by the data center. The task request 407 can also include a request to configure a configuration of the task scheduler 401, a cluster controller 403, the sub-cluster controller 501, or the node 405. More specifically, the task request can include a request to configure collecting and forwarding of all kinds of scheduling information of each entity in the task scheduling system 400, as well as processing of the received task requests 407 in each entity of the task scheduling system 400.

The computing system 400 and the computing system 500 as described in view of FIGS. 4 to 6 above optionally can consider explicit constraints defined in the task request 407 and/or implicit constraints imposed by the task request 407 when processing the received task request 407. The explicit constraint can include requirements regarding memory, CPUs, GPUs, storage, I/O bandwidth, or network bandwidth of a task request. The implicit constraint can include information about which user send the task request 407, from what source in the network the request 407 was sent, a type of the task request 407 or heuristic information about how a previous task request similar to the received task request 407 was scheduled.

More specifically, the task scheduler 401 can optionally be configured to obtain the adapted task request 408 and/or to forward the adapted task request to one of the at least two cluster controllers 403 based on an explicit constraint defined in the task request 407 and/or on an implicit constraint imposed by the task request 407.

Further, each cluster controller 403 can optionally be configured to obtain the adapted cluster task request 410 and/or to forward the adapted cluster task request 410 to one of the at least two sub-cluster controllers 501 based on an explicit constraint defined in the adapted task request 408 and/or an implicit constraint imposed by the adapted task request 408. That is, the adapted task request 408 includes similar constraints or a subset of the constraints as included in the task request 407.

In case that sub-cluster controllers 501 are present in the computing system 500, each sub-cluster controller 501 can be optionally configured to obtain the adapted sub-cluster task request 502 and/or to forward the adapted sub-cluster task request 502 to one of the nodes 405 based on an explicit constraint defined in the adapted cluster task request and/or an implicit constraint imposed by the adapted cluster task request 410. That is, the adapted cluster task request 410 also includes similar constraints or a subset of the constraints as included in the task request 407.

In the following, an example is given how a task request including several constraints is processed in the task scheduling system 500.

A task request according to the following structure is received in the task scheduling system 500 (the information in brackets defines explicit constraints regarding required hardware resources for a computation task according to a received task request 407).

Task (memory=10 megabytes (MB), CPUs=2, GPUs=1, storage=10 gigabyte (GB), I/O bandwidth=500 MB/second (s), network bandwidth=1 GB/s).

After this request is received by the task scheduling system 500, the task scheduler 401 selects a cluster controller 403 which is responsible for a node 405 having the above-mentioned resources. The task scheduler 401 exclusively checks, which cluster of the corresponding cluster controller 403 can provide these resources and then forwards an adapted task request 408 to the respective cluster controller 403. As only very little scheduling information 409 stored in the task scheduler 401 has to evaluated in order to make this decision, processing efficiency is increased. Once the adapted task request 408 is received by a cluster controller 403, the cluster controller 403 checks which sub-cluster controller 501 in what rack of the data center can provide the above-mentioned resources, which are specified in the adapted task request 408. Only very little cluster scheduling information 411 stored in the cluster controller 403 has to be evaluated in order to make this decision, which increases processing efficiency of the cluster controller 403. The cluster controller 403 selects a sub-cluster controller according to the above required resources and forwards an adapted cluster task request 410 to the sub-cluster controller 501. After receiving the adapted cluster task request 410, the sub-cluster controller 501 selects a node 405 which can provide the above-mentioned resources according to the adapted cluster task request 410 and forwards an adapted sub-cluster task request 502 to the selected node 405. As only very little sub-cluster scheduling information 503 in the sub-cluster controller 501 has to be considered to make this decision, over a processing efficiency of the task scheduling system 500 is increased. Once the node 405 receives the adapted sub-cluster task request 502, it provides hardware resources according to the above requirements which are defined in the adapted sub-cluster task request to a computation task according to the received task request 407.

In a specific operating example, the computing system 400 or the computing system 500 continuously monitors the nodes 405 and can dynamically reschedule a computation task that was scheduled according to a task request 407, if required. Rescheduling the computation task can include scheduling the computation task to a different (e.g. more powerful) node 405.

In a further operating example, the computing system 400 or the computing system 500 can monitor if there is any contention in memory access between different NUMA nodes on a node 405. If such a contention is detected, the NUMA nodes can be migrated to different nodes 405 in order to avoid memory access contention.

In a further operating example, the computing system 400 or the computing system 500 can monitor used network bandwidth and network traffic between two racks in the data center (by the sub-cluster controllers 501 which are associated with racks in the data center). If used network bandwidth or network traffic exceeds a predefined threshold, and if the traffic is caused by virtual machines, the task scheduling system 400 or the task scheduling system 500 can migrate the respective virtual machine to two nodes 405 to a same rack in order to optimize network bandwidth shortage.

In a further operating example of the computing system 400 or the computing system 500, all scheduling entities which are located in a same level of the data center can exchange information among each other in order to perform load balancing between nodes 405 or racks or clusters of a data center by rescheduling tasks according to the information exchanged between the scheduling entities on the same level of the data center.

Figure 7:
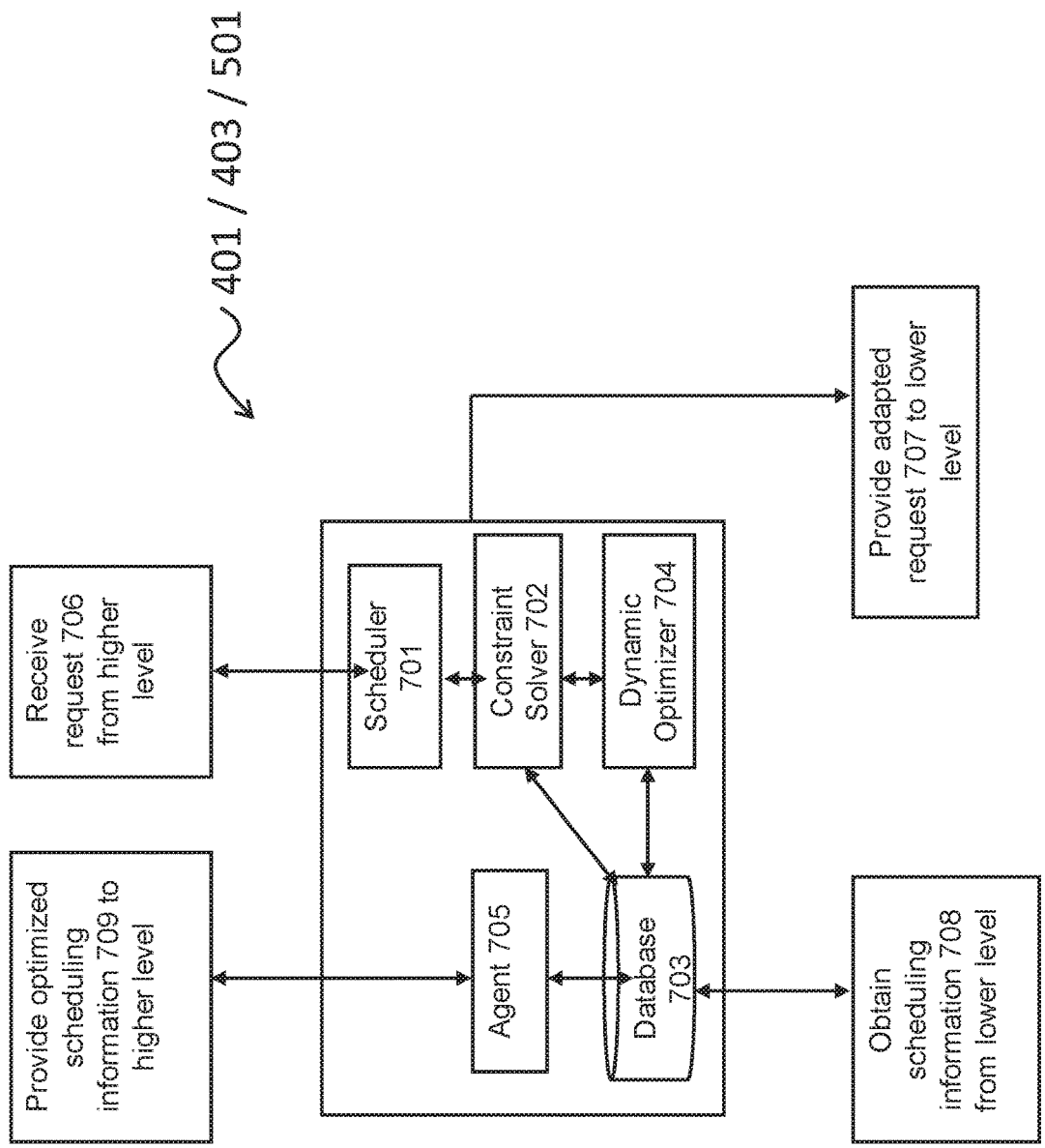
FIG. 7 shows a schematic overview of a task scheduler 401/cluster controller 403/sub-cluster controller 501 according to the present disclosure.

FIG. 7 shows a schematic overview of a task scheduler 401/cluster controller 403/sub-cluster controller 501 according to the present disclosure.

In the description in view of FIG. 7, the task scheduler 401, the cluster controller 403, and the sub-cluster controller 501 are synonymously referred to as a task scheduler. The task scheduler of FIG. 7 includes a scheduler 701, a constraint solver 702, a data base 703, a dynamic optimizer 704 and an agent 705.

As the internal features and functionalities of the task scheduler 401, the cluster controller 403 and the sub-cluster controller 501 are similar, the task request 407, the cluster task request 410 and the sub-cluster task request 502 are commonly referred to as a request 706 in FIG. 7. The same applies for the adapted task request 408, the adapted cluster task request 410 and the adapted sub-cluster task request 502, which are commonly referred to as an adapted request 707 in FIG. 7. The scheduling information 409, the cluster scheduling information 411, and the sub-cluster scheduling information 503 are commonly referred to as scheduling information 708 in FIG. 7. The optimized cluster scheduling information, the optimized sub-cluster information and the optimized status and/or configuration information is commonly referred to as optimized scheduling information 709 in view of FIG. 7.

The scheduler 701 receives requests 706 from a higher level in the scheduling hierarchy, and obtains queries based on constraints (i.e. the explicit constraints and/or the implicit constraints that are included in the received request 706. The scheduler 701 is in particular responsible for allocating hardware resources of the node 407 to a computation task according to the received request 706. To do so, the scheduler 701 forwards the created queries to the constraint solver 702. The constraint solver can be regarded a first order logic, which accepts the queries and solves them to provide an optimal scheduling solution to the scheduler 701. In the following example, a query is shown according to which a free NUMA node can be obtained on a node 405, wherein the NUMA node requires 10 GB of memory, 4 CPUs, and 1 GPU.

For example, the query may look like get_free_node ($c1$=10 GB, $c2$=4 CPUs, $c3$=1 GPU).

The constraint solver 702 solves this query based on the scheduling information 708 stored in the data base 703. The above example query in particular returns nodes 405 with the required resources that are connected to a sub-cluster controller 501 (i.e. a controller located in a rack level of a data center).

The following example query can be used to obtain an optimal NUMA node which complies with the given requirements. The NUMA node is in particular located within a node 405, which is, why the following example query is solved on node level get_free_NUMA_node ($c1$=10 GB, $c2$=2 virtual CPUs (VCPUs), $c3$=1 GPU).

The data base 703 stores the scheduling information 708. This may in particular include information regarding a status and/or a configuration of nodes 405 in a data center, information regarding networking components (such as routers or switches) in the data center, information regarding the topology of the data center, information regarding tasks and services that are provided in the data center, information regarding a used bandwidth or load of components located in the data center. The information stored in the data base is in particular obtained by agents that are running on the nodes 405, and that can also run on networking hardware such as switches or routers. By storing the scheduling information 708 in a data base 703 of each task scheduler 401, cluster controller 403 and sub-cluster controller 501, the overall amount of information stored in the data center can be hierarchically distributed, which helps to prevent bottle necks and overload situations. The data base 703 can be provided by means of common data base principles such as SQL, or a key-value store, or simply a text file.

In a software defined networking (SDN) environment, information regarding tasks, virtual machines or containers stored in the data base 703 can be used to configure any kind of service in the data center such as making snapshots of a virtual machine, configuring a firewall, bandwidth management, immigration management, suspending or powering off or on virtual machines, applying load balance to the virtual machines, etc.

The dynamic optimizer 704 is responsible for dynamically optimizing task scheduling of the initial placement of a computation task on a node 405, respectively or initial provisioning of hardware resources of a node 405 to a computation task. The dynamic optimizer 704 runs an optimization algorithm periodically, based on the scheduling information 708 which is available in the data base 703. The dynamic optimizer 704 in particular can optimize a configuration on a respective level of the data center in which the device containing the dynamic optimizer 704 is applied. For example by exchanging messages with devices on a same level, the dynamic optimizer 704 can re-adjust a distribution of computation tasks to hardware resources, in order to implement load balancing of tasks or virtual machines running on the nodes 405.

Another operating example, which can be achieved by the computing system 500, and in particular by the dynamic optimizer 704, is that tasks or virtual machines that provide a same type of service or a relate to a same type of application can be placed on same nodes 405, or on nodes 405 which are located in a same vicinity (i.e. located in a same rack of the data center).

As it is shown in FIG. 7, the agent 705 is responsible for obtaining optimized scheduling information 709, in particular based on the scheduling information 708 which is stored in the data base 703, and to provide the optimized scheduling information 709 to scheduling entities which are arranged in a higher level of the task scheduling hierarchy.

Further, as shown in FIG. 7, the task scheduler 401, the cluster controller 403, and the sub-cluster controller 501 is in particular able to provide the adapted request 707 to scheduling entities in a lower level of the scheduling hierarchy, based on the processing results of the scheduler 701, the constraint solver 702, the data base 703, the dynamic optimizer 704 and the agent 705.

Figure 8:
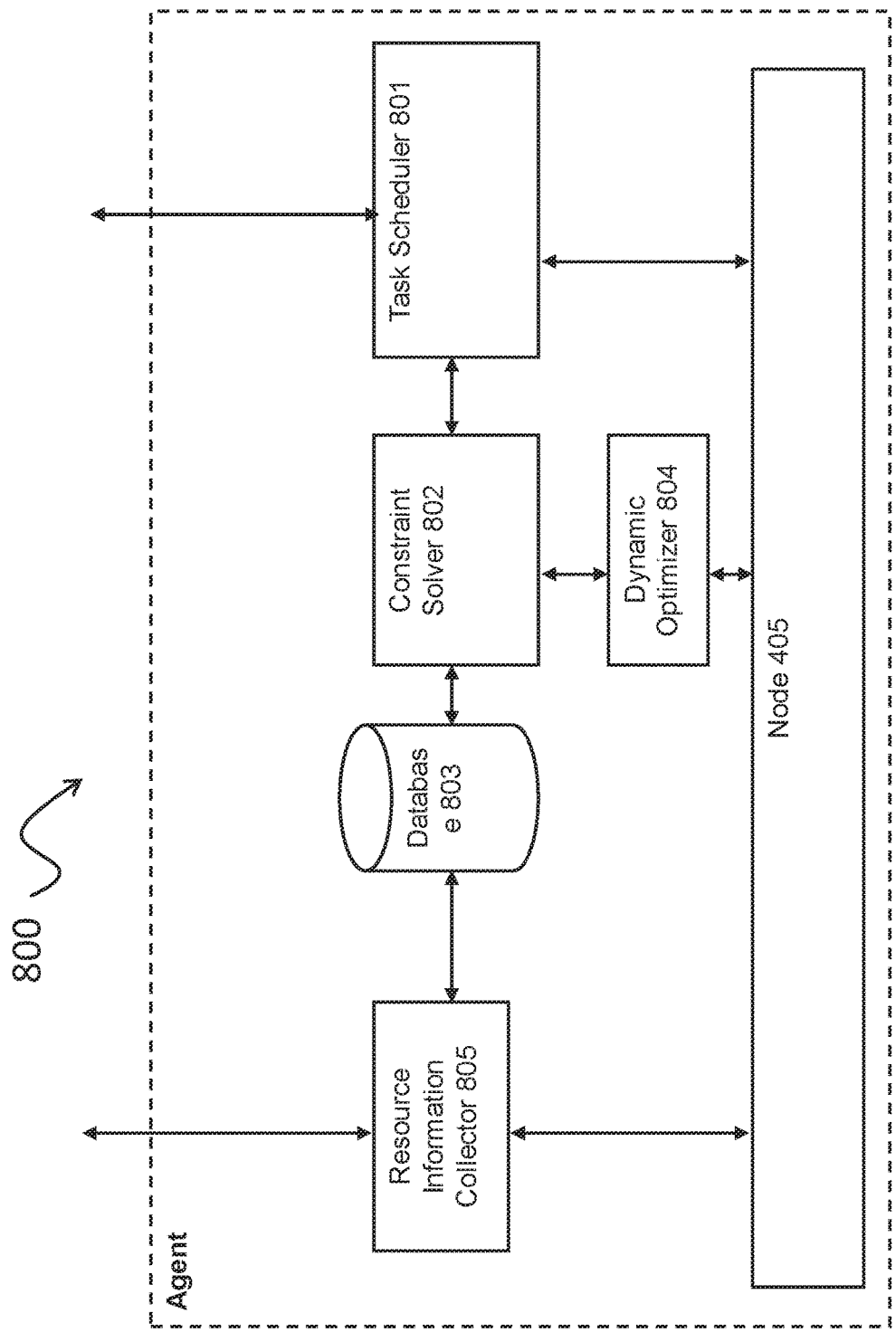
FIG. 8 shows a schematic overview of an agent 800 according to the present disclosure.

FIG. 8 shows a schematic overview of an agent 800 which is in particular suitable for running on a node 405 according to the present disclosure.

The agent 800 includes a task scheduler 801, a constraint solver 802, a data base 803, a dynamic optimizer 804 and a resource information collector 805, which can be operated in the same manner as the scheduler 701, the constraint solver 702, the data base 703, the dynamic optimizer 704 and the agent 705. The task scheduler 801, the dynamic optimizer 804 and the resource information collector 805 are in particular able to access an operating system or hardware resources of a node 405.

In the agent 800, the resource information collector 805 collects status and/or configuration information, which additionally can include information regarding tasks, processes and run time behavior of a node 405, and stores the collected information in the data base 803. The data base 803 stores fine grained information, and provides coarse grained information (i.e. optimized scheduling information 709) to a scheduling entity in a higher level of the scheduling hierarchy. For example, only coarse grained information such as information regarding memory, CPU and storage of a node 405 are provided to a higher lever, since this is enough information to make a decision on which node 405 a task is to be scheduled or where hardware resources for a computation task are located.

Figure 9:
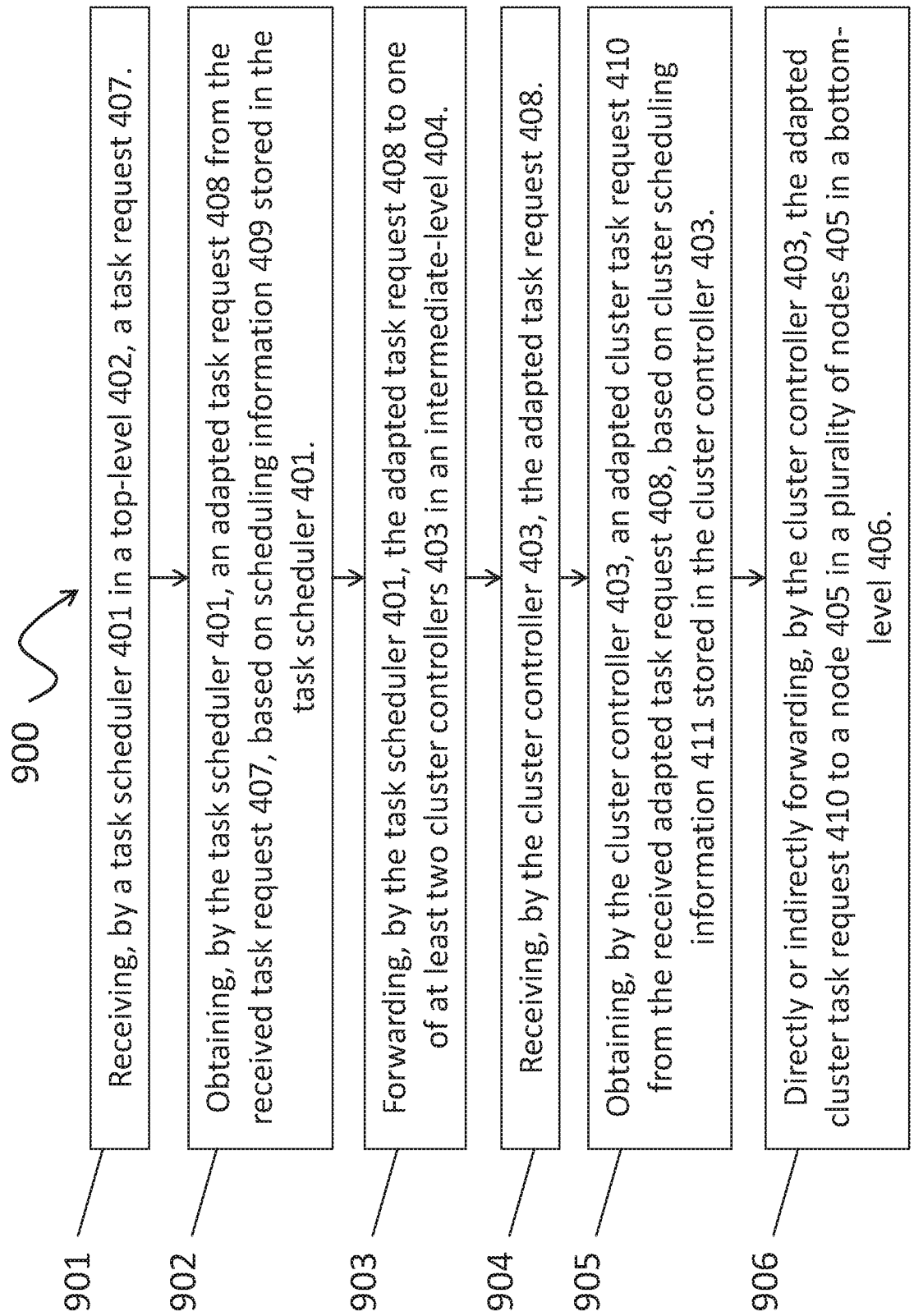
FIG. 9 shows a method 900 according to an embodiment of the present disclosure.

FIG. 9 shows a method 900 according to an embodiment of the present disclosure. In a first step 901, the method includes receiving, by a task scheduler 401 in a top level 402, a task request 407. The method includes a second step 902 of obtaining, by the task scheduler 401, an adapted task request 408 from the received task request 407, based on scheduling information 409 stored in the task scheduler 401. The method includes a further step 903 of forwarding, by the task scheduler 401, the adapted task request 408 to one of at least two cluster controllers 403 in an intermediate-level 404. The method includes a further step 904 of receiving, by the cluster controller 403, the adapted task request 408. The method includes a further step 905 of obtaining, by the cluster controller 403, an adapted cluster task request 410 from the received adapted task request 408, based on cluster scheduling information 411 stored in the cluster controller 403. The method includes a last step 906 of directly or indirectly forwarding, by the cluster controller 403, the adapted cluster task request 410 to a node 405 in a plurality of nodes 405 in a bottom level 406.

Figure 10:
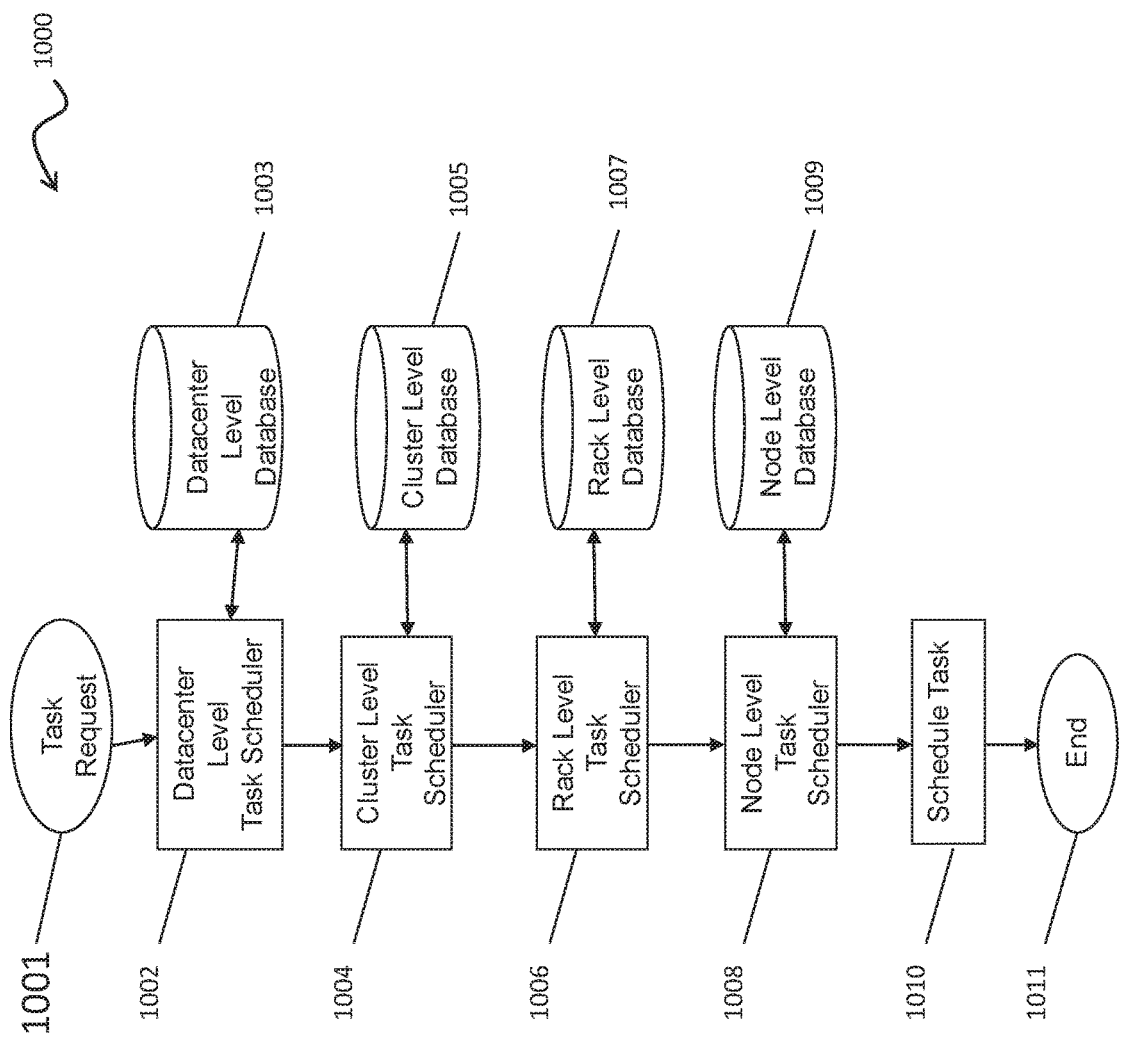
FIG. 10 shows another method 1000 according to the present disclosure.

FIG. 10 shows another method 1000 according to the present disclosure. In a first step 1001 a task request is provided to a task scheduler. In a second step 1002, the task request is received by the task scheduler, which is located in a top level (i.e. a data center level, that is, the task scheduler is responsible for scheduling tasks per data center). In a further step 1003, the task scheduler queries a data center level data base in the task scheduler in order to decide to which cluster level task scheduler (i.e. to which cluster controller) an adapted task request is to be forwarded. In a further step 1004 the adapted task request is received by the cluster level task scheduler. In a further step 1005 the cluster level task scheduler queries a cluster level data base in the cluster level task scheduler in order to decide to which rack level scheduler (i.e. to which sub-cluster controller) a further adapted task request is to be forwarded. In a further step 1006, the further adapted task request is received by a rack level task scheduler. The rack level task scheduler queries a rack level data base inside the rack level task scheduler in step 1007 in order to decide to which node level task scheduler (i.e. to which node) the finally adapted task request is to be forwarded. In step 1008 the finally adapted task request is received at the node level task scheduler. The node level task scheduler queries a node level data base inside the node level task scheduler in step 1009 in order to decide how, in step 1010, the node, respectively what hardware resources of the node are to be allocated to a computation task according to the finally adapted task request. In step 1011, the method successfully terminates.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an or" does not exclude a plurality. A single element or other unit may fulfill the functions of several entities or items recited in the claims. The mere fact that certain measures are recited in the mutual different dependent claims does not indicate that a combination of these measures cannot be used in an advantages implementation.

The invention claimed is:

1. A computing system for hierarchical task scheduling, comprising: a processor in a top-level layer and configured to:
store scheduling information;
receive a task request;
obtain an adapted task request from the task request based on the scheduling information and the task request by removing information overhead only used for processing at the top-level layer from the task request as determined by the scheduling information; and
forward the adapted task request based on the scheduling information;
a plurality of nodes in a bottom-level layer, wherein the nodes are coupled to the processor;
cluster controllers in an intermediate-level layer and coupled to the processor and the nodes, wherein each cluster controller of the cluster controllers is configured to:
store cluster scheduling information;
receive, from the processor, the adapted task request;
obtain an adapted cluster task request from the adapted task request based on the cluster scheduling information and the adapted task request by removing information overhead only used for processing at the cluster controller from the adapted task request as determined by the cluster scheduling information; and
forward the adapted cluster task request to a respective sub-cluster controller in the intermediate-level layer based on the cluster scheduling information; and
sub-cluster controllers in the intermediate-level layer and coupled to the cluster controllers, and wherein each sub-cluster controller of the sub-cluster controllers is configured to:
store sub-cluster scheduling information;
receive the adapted cluster task request from a respective cluster controller of the cluster controllers;
obtain an adapted sub-cluster task request from the adapted cluster task request based on the sub-cluster scheduling information by removing information overhead only used for processing at the sub-cluster controller from the adapted cluster task request as determined by the sub-cluster scheduling information; and
forward the adapted sub-cluster task request to a respective node of the nodes based on the sub-cluster scheduling information.

2. The computing system of claim 1, wherein the processor is further configured to obtain the scheduling information based on optimized cluster scheduling information provided by the cluster controllers.

3. The computing system of claim 1, wherein each of the cluster controllers is further configured to obtain the cluster scheduling information based on optimized status information or configuration information directly or indirectly received from agents in the nodes.

4. The computing system of claim 3, wherein each of the agents is further configured to analyze a status or a configuration of a corresponding node of the nodes to obtain the optimized status information or the configuration information.

5. The computing system of claim 1, wherein each of the cluster controllers is further configured to obtain the cluster scheduling information based on optimized sub-cluster information from the sub-cluster controllers.

6. The computing system of claim 1, wherein each of the sub-cluster controllers is further configured to obtain the sub-cluster scheduling information based on optimized status information or configuration information directly or indirectly received from agents in the nodes.

7. The computing system of claim 1, wherein each of the nodes is further configured to schedule a task to a resource in a respective node based on a respective adapted sub-cluster task request of the adapted sub-cluster task request.

8. The computing system according to claim 1, wherein the processor is further configured to obtain the adapted task request or to forward the adapted task request to one of the cluster controllers based on an explicit constraint defined in the task request or an implicit constraint imposed by the task request.

9. The computing system of claim 1, wherein each of the cluster controllers is further configured to obtain the adapted cluster task request or to forward the adapted cluster task request to one of the sub-cluster controllers based on an explicit constraint defined in the adapted task request or an implicit constraint imposed by the adapted task request.

10. The computing system of claim 1, wherein each of the sub-cluster controllers is further configured to obtain the adapted sub-cluster task request or to forward the adapted sub-cluster task request to one of the nodes based on an explicit constraint defined in the adapted cluster task request or an implicit constraint imposed by the adapted cluster task request.

11. A hierarchical task scheduling method comprising:
receiving, by a processor in a top-level layer, a task request;
obtaining, by the processor, an adapted task request from the task request based on scheduling information stored in the processor and the task request by removing information overhead only used for processing at the top-level layer from the task request as determined by the scheduling information;
forwarding, by the processor, the adapted task request to a respective cluster controller of cluster controllers in an intermediate-level layer based on the scheduling information;
receiving, by the respective cluster controller, the adapted task request;
obtaining, by the respective cluster controller, an adapted cluster task request from the adapted task request based on cluster scheduling information stored in the cluster controllers by removing information overhead only used for processing at the cluster controller from the adapted task request as determined by the cluster scheduling information;
forwarding, by the respective cluster controller, the adapted cluster task request to a respective sub-cluster controller of sub-cluster controllers in the intermediate-level layer based on the cluster scheduling information;

receiving, by the respective sub-cluster controller, the adapted cluster task request from the respective cluster controller of the cluster controllers;

obtaining, by the respective sub-cluster controller, an adapted sub-cluster task request from the adapted cluster task request based on sub-cluster scheduling information and the adapted cluster task request by removing information overhead only used for processing at the sub-cluster controller from the adapted cluster task request as determined by the sub-cluster scheduling information; and forwarding, by the respective sub-cluster controller, the adapted sub-cluster task request to a respective node of in a plurality of nodes in a bottom-level layer based on the sub-cluster scheduling information.

12. The hierarchical task scheduling method of claim 11, further comprising, obtaining, by the processor, the scheduling information based on optimized cluster scheduling information provided by the cluster controllers.

13. The hierarchical task scheduling method of claim 11, further comprising obtaining, by the processor, the scheduling information based on optimized cluster scheduling information provided by the cluster controllers.

14. The hierarchical task scheduling method of claim 11, further comprising obtaining, by each of the cluster controllers, the cluster scheduling information based on optimized status information or configuration information directly or indirectly received from agents in the nodes.

15. The hierarchical task scheduling method of claim 14, further comprising analyzing, by each of the agents, a status or a configuration of a corresponding node of the nodes to obtain the optimized status information or the configuration information.

16. The hierarchical task scheduling method of claim 11, further comprising obtaining, by each of the cluster controllers, the cluster scheduling information based on optimized sub-cluster information from the sub-cluster controllers.

17. The hierarchical task scheduling method of claim 11, further comprising obtaining, by each of the sub-cluster controllers, the sub-cluster scheduling information based on optimized status information or configuration information directly or indirectly received from agents in the nodes.

18. The hierarchical task scheduling method of claim 11, further comprising scheduling, by each of the nodes, a task to a resource in a respective node based on a respective adapted sub-cluster task request of the adapted sub-cluster task request.

19. The hierarchical task scheduling method of claim 11, further comprising obtaining, by the processor, the adapted task request or forwarding the adapted task request to one of the cluster controllers based on an explicit constraint defined in the task request or an implicit constraint imposed by the task request.

20. The hierarchical task scheduling method of claim 11, further comprising obtaining, by each of the cluster controllers, the adapted cluster task request or forwarding the adapted cluster task request to one of the sub-cluster controllers based on an explicit constraint defined in the adapted task request or an implicit constraint imposed by the adapted task request.

* * * * *